(12) United States Patent
Wu et al.

(10) Patent No.: US 6,549,512 B2
(45) Date of Patent: *Apr. 15, 2003

(54) MDSL DMT ARCHITECTURE

(75) Inventors: Song Wu, Plano, TX (US); Donald P. Shaver, Dallas, TX (US); Yaqi Cheng, Rowlett, TX (US)

(73) Assignee: Texas Instruments Incorporated, Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/105,134

(22) Filed: Jun. 25, 1998

(65) Prior Publication Data
US 2002/0172146 A1 Nov. 21, 2002

Related U.S. Application Data (60) Provisional application No. 60/050,707, filed on Jun. 25, 1997, and provisional application No. 60/050,753, filed on Jun. 25, 1997.

(51) Int. Cl.[7] .................................................. H04J 11/00
(52) U.S. Cl. ........................ 370/210; 375/233; 375/350
(58) Field of Search ................................. 370/276, 419, 370/445, 463, 465, 210, 498, 507, 545, 468, 487, 295, 206, 480, 484, 477; 375/260, 221, 222, 225, 229, 345, 371, 231, 233, 350; 708/323; 455/245.1

(56) References Cited

U.S. PATENT DOCUMENTS

| | | | | |
|---|---|---|---|---|
| 4,683,578 A | * | 7/1987 | Betts et al. | .................... 375/98 |
| 5,400,322 A | * | 3/1995 | Hunt et al. | .................... 370/19 |
| 5,479,447 A | * | 12/1995 | Chow et al. | ................. 375/260 |
| 5,999,563 A | * | 12/1999 | Polley et al. | ................ 375/222 |
| 6,052,380 A | * | 4/2000 | Bell | ............................ 370/445 |
| 6,389,062 B1 | * | 5/2002 | Wu | ............................. 375/222 |

\* cited by examiner

*Primary Examiner*—Alpus H. Hsu
*Assistant Examiner*—Duc Ho
(74) *Attorney, Agent, or Firm*—Warren L. Franz; Wade James Brady, III; Frederick J. Telecky Jr.

(57) ABSTRACT

A DMT device having an analog front end for receiving an analog signal, a converter for converting the analog signal to a digital signal, a FFT for converting the digital signal from the time domain to the frequency domain and feeding the digital signal to a frequency domain equalizer having variable coefficients for flattening the converted digital signal. The frequency domain equalizer includes a gain corrector coupled to the FFT to compensate the channel frequency rolloff and make each tone approximately the same amplitude before phase rotation and a phase rotator portion responsive to the output of the gain corrector to track small channel variation. Also included is circuitry for updating the coefficients of the frequency domain equalizer, preferably in the form of a slicer for controlling the frequency domain equalizer by feeding back an error signal thereto. The error signal is preferably fed back to the phase rotator portion of the frequency domain equalizer.

6 Claims, 5 Drawing Sheets

MDSL DMT ARCHITECTURE

CROSS-REFERENCE TO RELATED APPLICATIONS

This application claims priority under 35 U.S.C. §119(e)(1) of provisional applications Serial No. 60/050,707, filed Jun. 25, 1997 and Serial No. 60/050,753, filed Jun. 25, 1997, the entireties of which are incorporated herein by reference.

TECHNICAL FIELD

This invention relates to modem data communications between telecommunications networks and remote or end user installations over twisted metallic wire pairs.

BACKGROUND OF THE INVENTION

The background of the invention is given in copending Ser. No. 08/667,267, filed Jun. 20, 1996, entitled "Multimode Digital Modem"; U.S. Pat. No. 5,285,474; U.S. Pat. No. 5,400,322; U.S. Pat. No. 5,479,447; U.S. Pat. No. 5,623,513; ANSI TI.413-1995, "Network and Customer Installation Interfaces—Asymmetric Digital Subscriber Line (ADSL) Metallic Interface" (1995); and ANSI TI.413 Issue 2, "Interface Between Networks and Customer Installation—Asymmetric Digital Subscriber Line (ADSL) Metallic Interface" (draft May 4, 1998); the entireties of all of which are incorporated herein by reference.

SUMMARY OF THE INVENTION

The invention provides a medium rate digital subscriber line modem solution for modem data communications between telecommunications networks and remote or end user installations over twisted metallic wire pairs.

DETAILED DESCRIPTION OF THE PREFERRED EMBODIMENTS

The embodiments of the invention have been chosen for purposes of illustration and are described below:

1. Introduction

Asymmetric Digital Subscriber Line (ADSL) is a technology to deliver up to 8 MBPS downstream and 1 MBPS upstream duplex data rate from the telephone company's central office to the residential home using existing twisted copper pairs. The standard has been defined by the ANSI standard committee to use Discrete Multi-Tone (DMT) modulation scheme as a line code and support four asymmetrical downstream and three duplex upstream multiplexed channels. It requires the data rate and distance reach at least for 1.5 Mbps and 18 kft respectively. However, due to technology and market difficulties, the standard ADSL approach has not been widely adopted as a cost effective solution. On the other hand, as the internet access market grows up rapidly, it is highly desirable to have low cost high speed access solutions.

Medium-rate Digital Subscriber Line (MDSL,) provides an ideal solution to this internet access market. MDSL chooses a modified DMT modulation scheme and has rate adaptive capability. The data rate is negotiable between the central office and remote modems, depending on the line condition. In fact, MDSL DMT technology implemented on a 100 Mips Digital Signal Processor (DSP) is the most cost effective DSL modem available today. As MDSL DMT based on the programmable DSP solutions, it allows itself to be integrated with current 56 k, V.34 and ISDN, etc., commercial modems on a single chip and can be easily upgraded with software in the future.

2. Line Conditions and Impairments

The ANSI standard committee has defined the spectrum coverage and transmission power spectrum density (PSD) for ADSL applications. The spectrum covers from 4 kHz up to 1 MHz and the transmission power spectrum density (PSD) is specified as −40 dBn/Hz. MDSL uses a subset of ADSL spectrum and complies with ANSI specifications on PSD. As a result MDSL will not cause any extra interference to the ANSI ADSL plant.

Figure 1:
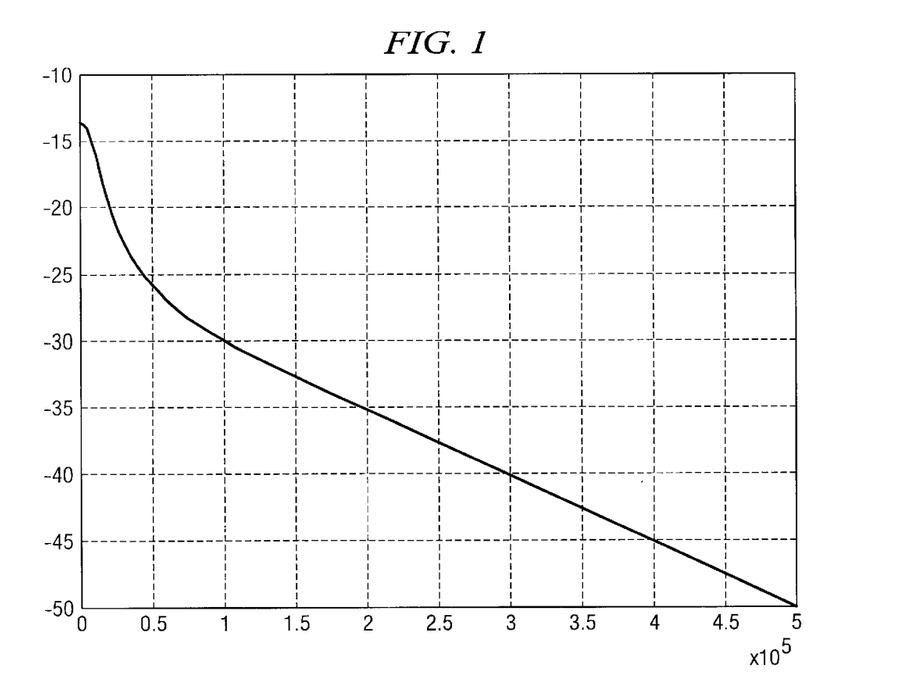
FIG. 1 shows the channel frequency response of an 18 kft twisted copper pair cable.

The ANSI channel model and impairments model are used for the MDSL modem design. In ANSI standard the xDSL technology uses existing twisted copper pair as transmission media. The cable has severe distortion in the megahertz regime. The channel distortion within the ADSL spectrum band is shown in FIG. 1. It can be seen that the signal is attenuated by the loop and the high frequency attenuation is much higher than that of low frequency. Generally the longer the cable, the higher the loop attenuation is and the faster the signal rolls off in frequency. FIG. 1 shows an example of 18 kft loop, the signal attenuation at 500 kHz can be 35 dB more than the signal at dc. In the ADSL standard the line noise floor is specified as −140 dBm/Hz and is a constant across the band. Thus, as the frequency goes higher, the signal to noise ratio (SNR) goes lower.

In the real loop environment as multiple phone lines merges within the same bundle the signal in one line can couple into its adjacent lines and creates near-end and far-end cross talk. As the frequency goes higher, the cross talk becomes stronger. The far-end cross talk attenuated by the line is less problematic. However, since the intensity of near-end cross talk is high, it degrades the performance of the modem receiver. The cross talk effect raises the receiver noise floor. The level of the receiver noise floor also depends on the number of disturbers in the loop plant.

Figure 2:
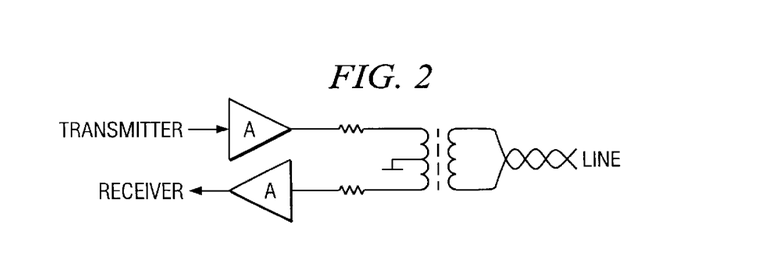
FIG. 2 shows a transformer coupling of an xDSL analog front end (AFE).

Another impairment on the xDSL receiver is the echo fed back from the transmission path. A typical modem analog front end (AFE) is shown in FIG. 2. As in typical telephone sets, the outgoing signal and incoming signal couples to the phone line via a transformer. The transformer circuit is configured as a balanced network. Theoretically, the outgoing signal does not mix with incoming signals at the receiver. However, since in the balanced network circuit the impedance does not match perfectly, the outgoing signal echoes back to the receiver. Practically the echo signal may be attenuated only 10 dB from the outgoing signal by the balanced network circuit. Comparing with 50 dB cable loss in FIG. 1, the echo signal is much stronger than the incoming signal. The modem receiver has to separate the signal from the strong echoes.

3. Frequency Division Multiplexing

Theoretically, in a full duplex modem, the receiver knows exactly what the transmitter is transmitting. The modem receiver can subtract the echo from the incoming data stream with advanced signal process algorithms. However, the echo cancellation algorithm typically requires powerful DSP horsepower which is inadequate with current low cost DSP. Also, since the echo signal can be 50 dB stronger than the incoming signal, both analog front end and DSP should have higher precision to cover the entire dynamic range. The cost of DSP and AFE is inversely proportional to their precision.

Figure 3:
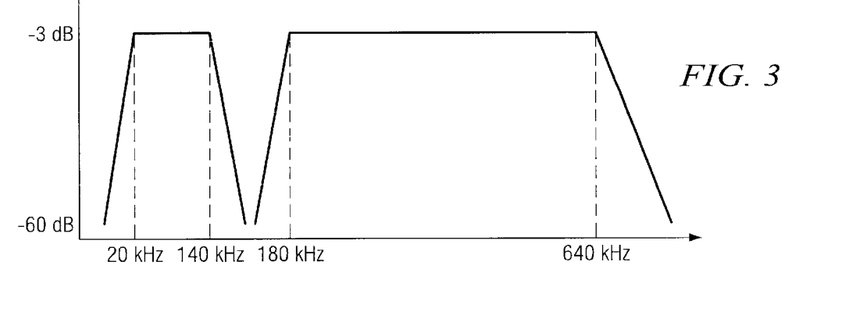
FIG. 3 shows a scheme of frequency division multiplexing.

FIG. 3 shows the spectrum diagram for frequency division multiplexing technique. The downstream spectrum separates from the upstream spectrum. As in the standard ADSL the higher frequency band is used for downstream and the lower frequency band is used for upstream. Since the modem transmitter and receiver use different frequency bands, the echo signal and the near-end cross talk can be filtered out from the incoming signal.

In difference from other xDSL technology, MDSL chooses the signal bandwidth based on the DSP horsepower and applications rather than the available channel capacity. Typical MDSL bandwidth is constrained to the subset of ADSL bandwidth. Therefore, it complies with ADSL loop requirements. The MDSL bandwidth can be upgraded when more powerful DSP becomes available.

One example of the MDSL bandwidth selection is shown in FIG. 3. The upstream transmission spectrum is from 20 to 140 kHz and the downstream spectrum is from 180 to 640 kHz. The overall bandwidth is about half that of ADSL. The DSP processing bandwidth is therefore less than 50% of ADSL. In the MDSL DMT system the spectrum isolation is provided by the AFE analog filters. To effectively filter out the echo and near-end cross talk, the filter requires to have a sharp cut-off. The filter specification is shown in Table 1:

TABLE 1

MDSL DMT filter specifications.

|  | Transmitter | Receiver |
|---|---|---|
| MTU-C | | |
| Passband @ −3 dB | 180 kHz–640 kHz | 20 kHz–140 kHz |
| Stop band | −24 dB @ 1104 kHz | −60 dB @ 180 kHz |
|  | −40 dB @ 140 kHz | |
| MTU-R | | |
| Passband @ −3 dB | 20 kHz–140 kHz | 180 kHz–640 kHz |
| Stop band | −24 dB @ 3.3 kHz | −40 dB @ 140 kHz |
|  | −60 dB @ 180 kHz | −40 dB @ 800 kHz |

4. Discrete Multi-Tone Modulation (DMT) Scheme

Figure 4:
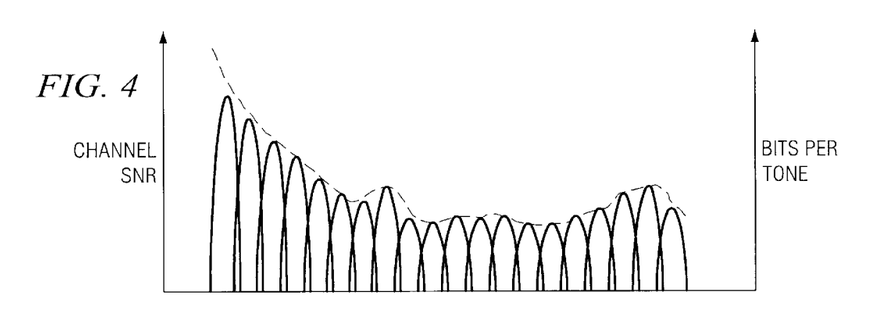
FIG. 4 shows a multi-carrier modulation scheme.

In xDSL application the channel signal to noise ratio (SNR) varies in frequency as discussed in section 2. Consequently the channel capacity differs with the frequency. The DMT modulation scheme uniformly divides the entire frequency band into a bank of 5 kHz bins. For each bin the data rate depends on the frequency bin's capacity as shown in FIG. 4. At the modem transmitter the transmitting data stream is de-multiplexed into the frequency bank, and at the receiver the data from each frequency bins are multiplexed back into a common stream. Since the transmitter typically does not know the channel condition, the bit rate assignment on each frequency bin has to go through an initial set-up process. Practically before the modem connection set-up, the modem transmitter sends a probe signal to measure the channel SNR on each frequency bin, and the modem receiver feeds back the measurement result to determine the bit rate assignment of each subcarrier.

Figure 5:
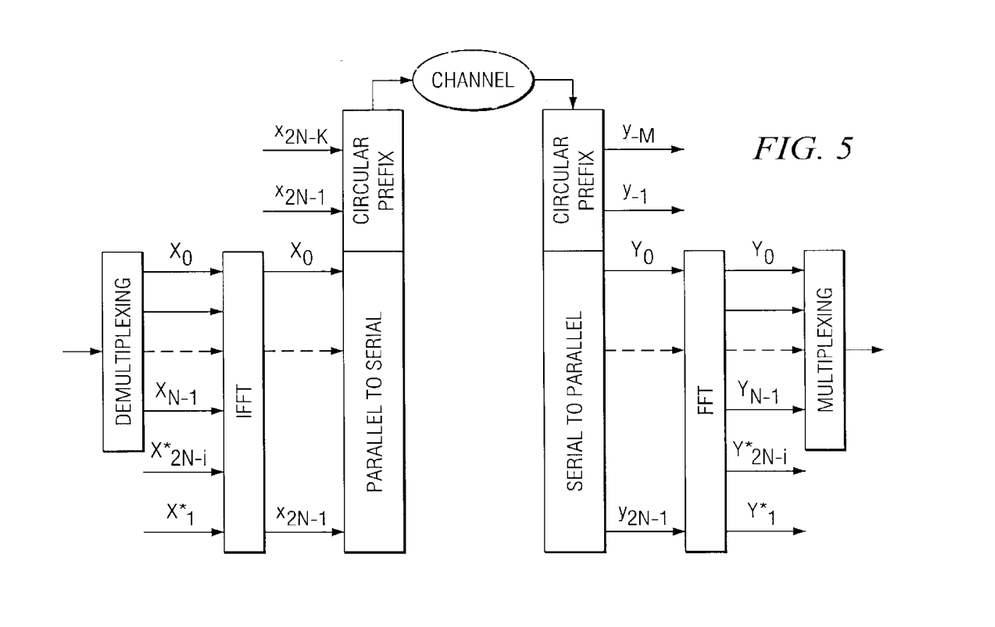
FIG. 5 is a block diagram of a DMT transmission system.

There are different ways to generate the frequency filter bank. DMT uses inverse FFT technique to map a time domain data stream into the frequency domain. As shown in FIG. 5, assuming the Nyquist frequency bin is at index N, the incoming data stream is mapped to half of IFFT complex input $X_i$, for i=0, to N−1. The other half of the input is obtained by Hermitian symmetry operation. That is:

$$X_i = \text{conj}[X_{2N-i}] \text{ fpr } o=N \text{ to } 2N-1$$

Then the IFFT output $$x_k = \sum_{i=0}^{2N-1} \exp\left(j\frac{ik\pi}{N}\right) \cdot X_i \quad (1)$$

only has real output and can drive a DAC transmission.

At the receiver end the received data $y_n$ is the transmission data $x_k$ linearly convoluted with the channel impulse response $h_i$ $$y_n = h_i \otimes x_k. \quad (2)$$

If data $x_k$ repeats every frame, the linear convolution of equation (2) is the same as a circular convolution. Applying FFT on both sides of (2) gives $$Y_k = H_k \cdot X_k$$

and $$X_k = Y_k / H_k \quad (3)$$

Figure 6:
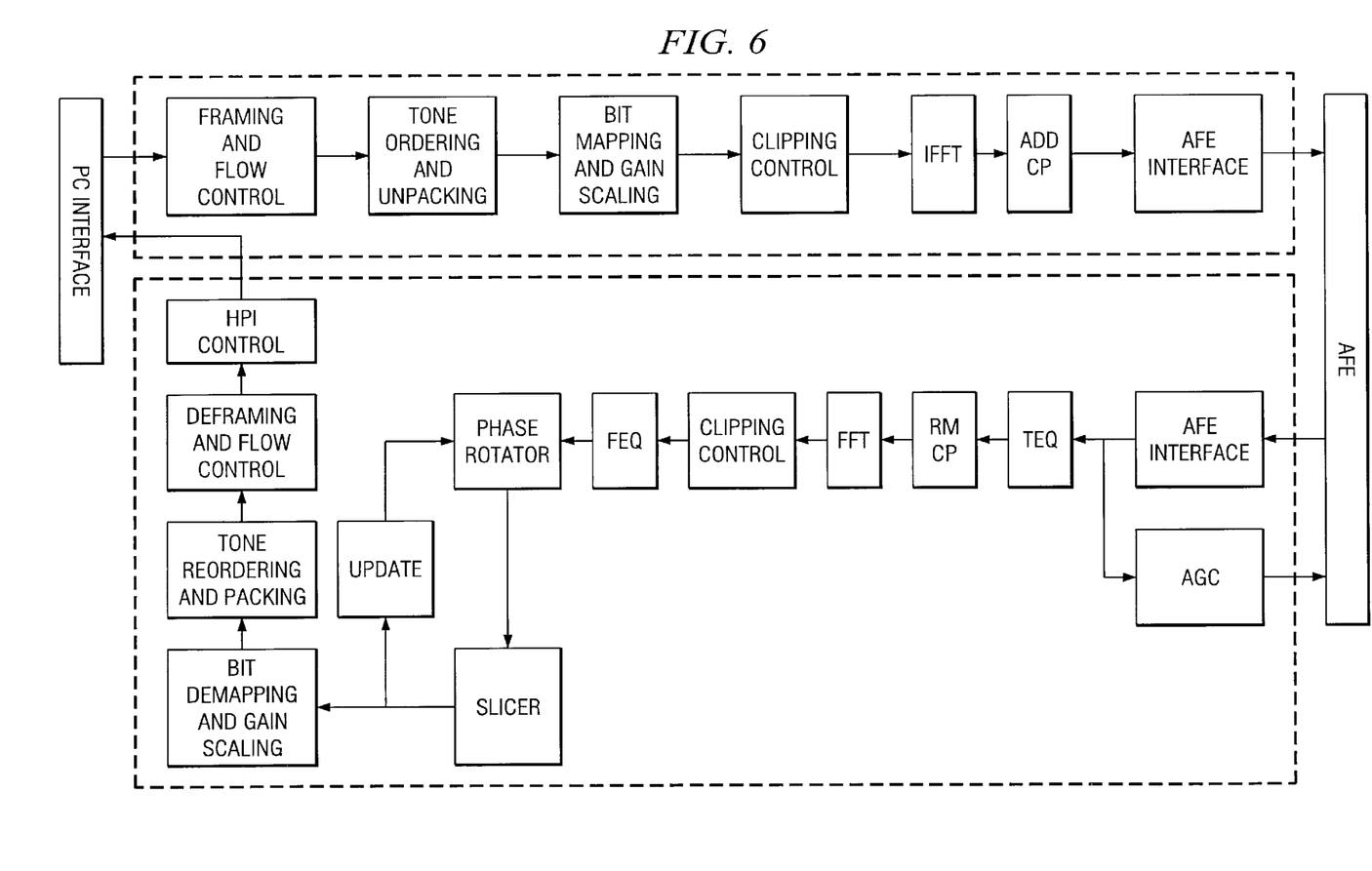
FIG. 6 is a block diagram of an MDSL central office location transceiver

The transmitting data can be easily recovered on the receiver. However, for a real transmission the data is impossible to repeat itself every frame. The relation (3) cannot be satisfied because the data in the previous frame leaks into the current frame and creates inter-symbol interference (ISI). To solve the problem circular prefix data should be prepended to the data stream $x_k$ before its transmission. As shown in FIG. 6 the data $$x_{-k} = x_{N-k} \text{ for } k=1 \text{ to } M$$

are inserted before $x_o$, where M is chosen to be longer than the channel impulse response. By adding the circular prefix the modified data stream (4) looks partially like circularly repeating itself.

At the receiver the data $$y_{-k} \text{ for } k=1 \text{ to } M$$

should be removed before FFT processing. Since the circular prefix length M is longer than the channel impulse response, starting from $y_o$ the linear convolution of equation (2) is the same as circular convolution. Therefore, the DMT receiver can still use equation (3) for demodulation.

5. MDSL DMT Specification

Figure 7:
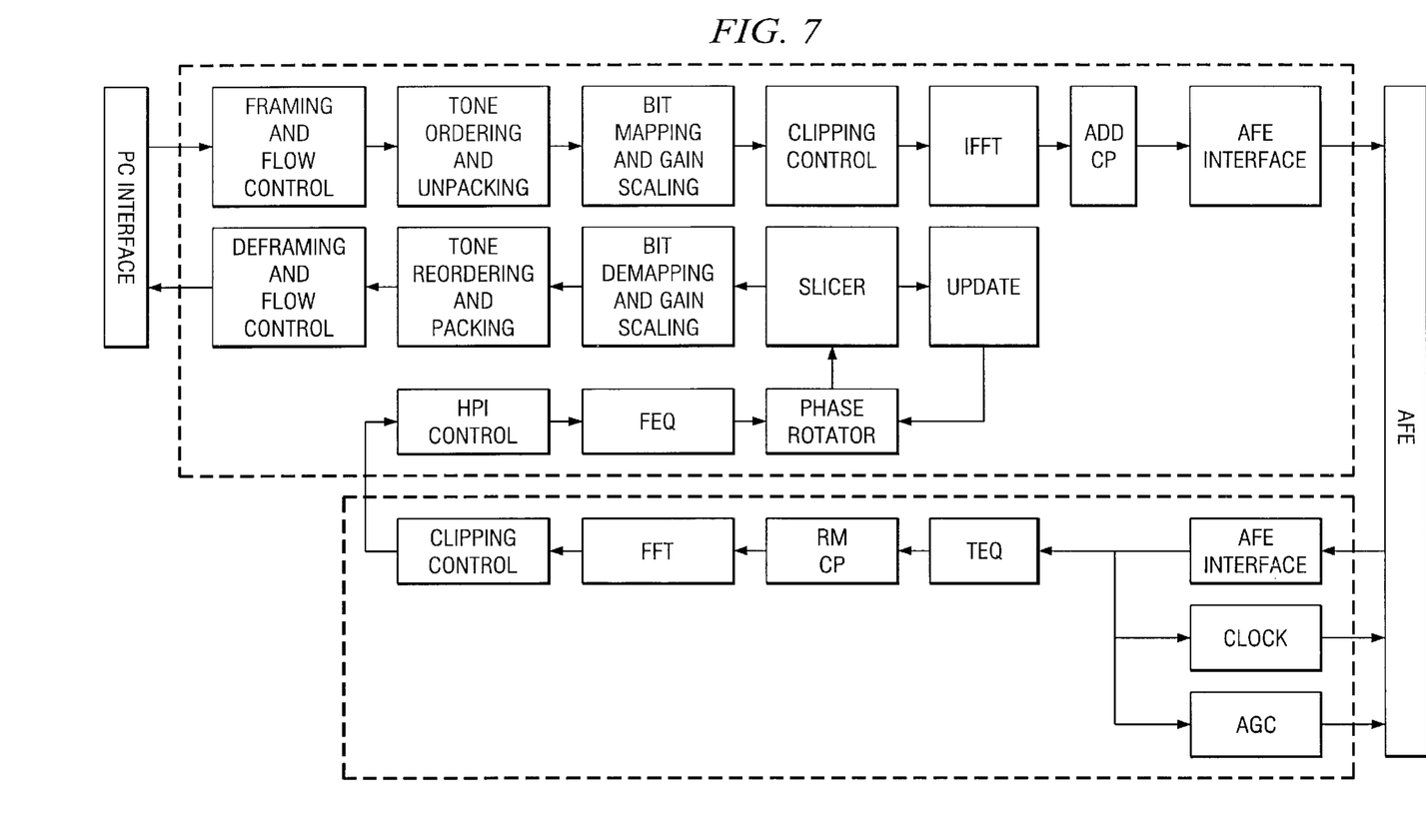
FIG. 7 is a block diagram of an MDSL remote user location transceiver.

MDSL DMT is designed as a Physical Media Dependent (PMD) layer device. It handles the physical layer functions of modulation, initialization, scramble and de-scramble, physical layer framing and flow control. MDSL DMT transceiver supports the downstream data rate up to 2.8 Mbps., upstream data rate up to 844 kbps and also rate adaptation capability with 64 kbps per step. FIGS. 6 and 7 show the dual DSP implementations of MDSL modem at the central office (MTU-C) and remote terminal (MTU-R). In this example two Texas Instruments 50 Mips C54x DSP are used. The principle and the specifications can be extended to other platforms.

5.1 MTU-C Specification

FIG. 6 shows the block diagram of the MTU-C transceiver data flow. In the downstream direction, the MTU-C receives data from the host (typically a PC), and packets the data in a physical layer frame. The packet data is then modulated to multiple DMT sub-carriers via IFFT process. The output of IFFT goes through the analog front end (AFE) to a physical phone wire.

In the upstream direction the data from AFE passes the time-domain equalizer (TEQ) to the input of FFT. A frequency-domain equalizer (FEQ) after the FFT equalizes the data from output of the FFT. The slicer following the FEQ finalizes the demodulation process and puts the data back to the stream. The receiver framing and flow control process re-organize the demodulated data and sends the data to the host. Each of the following sections discusses the individual block in detail.

5.1.1 Framing and Flow Control

To provide the flexible support to any kind of host network interface, MDSL DMT only assumes average backbone bandwidth. In many practical applications the backbone traffic can be burst, e.g. in the case that the host is a PC. Therefore, a buffer is typically required between the host and DMT modem. The depth of the buffer depends on the burst of host traffic. For shorter buffer size, it is possible that in certain time periods that receiver host takes data slower than that which the transmitter host sends. One solution to this problem is to use positive "flow control" method which requires the transmission site to receive a reply for a data packet having been sent before another data packet can be transmitted.

In many cases the MDSL line connection is in the idle mode, i.e. there is no data transmission from one site to another. However, to keep the synchronization of the modem receiver, the modem transmitter has to send random scramble dummy data when there is no real data transmission. It is important to make the valid data distinguishable from the dummy data. One solution is to use a packet data format. The typical packet has a header, data and circular redundant code (CRC) fields for bit synchronization, data transmission and error detection as follows:

| Header | Header | Data | Data | ... | Data | CRC |
|--------|--------|------|------|-----|------|-----|

The detail specification of flow control and framing is in reference [1].

To prevent consecutive "0s" and "1s" in the transmission stream and also to have the stream as random as possible, the data packet is scrambled before its transmission. At the receiver the complementary de-scrambling process converts the data stream back to its original sequence. The scrambler is defined as:

$$d'_n = d_n \oplus d'_{n-18} \oplus d'_{n-23}$$

5.1.2 Bit-loading and Constellation Encoding

Figure 8:
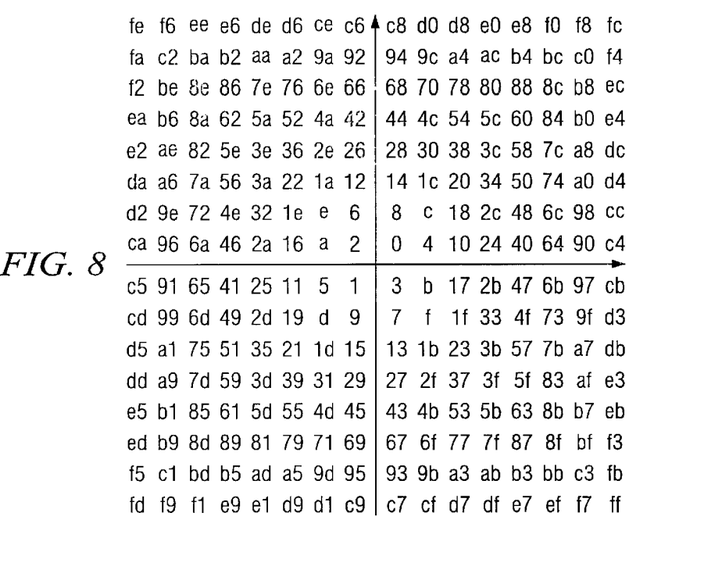
FIG. 8 shows a bit mapping scheme for an MDSL DMT transmission.

As discussed in section 4, the channel capacity varies with the frequency. Therefore the different frequency bin has a different constellation size. As MDSL DMT is implemented with programmable DSP, it is desirable to have a common nested constellation covering all different sizes. MDSL DMT uses maximum up to 8 bits constellation to reduce the precision requirements on DSP and AFE. The constellation encoding is therefore easily implemented with table lookup. FIG. 8 shows the nested 256-QAM constellation mapping.

For the constellation, the smaller constellation has lower average power. To achieve the channel capacity the transmission spectrum should be flat across the band. A different size of constellation has to be re-scaled as:

$$Z'_i = g_i(n) \cdot Z_i$$

where complex number $Z_i = X_i + j \cdot Y_i$ is the output from the encoder of the ith tone, and g(n) is the scaling factor of n-bit constellation. The value of g(n) is shown in Table 2:

TABLE 2

Gain table for constellation encoding

| n | g(n) |
|---|------|
| 2 | 9.219544 |
| 3 | 5.322906 |
| 4 | 4.123106 |
| 5 | 2.915476 |
| 6 | 2.011870 |
| 7 | 1.442051 |
| 8 | 1.000000 |

Since the number of bits on each tone distributes randomly across the band, it is expensive for DSP to process random bit manipulations. To efficiently implement bit-loading algorithm for all the sub-carriers, instead of encoding each frequency sub-carrier individually, the sub-carriers can be grouped and encoded together [2]. During the initialization process the modem receiver measures the channel SNR and computes the bit capacity of each sub-carrier. The tone index and corresponding scaling factor are stored in the descending order of bit table. A sorting algorithm then groups the tones in a set, in which the sum of bits on each sub-carrier of the set is equal to 16. Then the tone index and the corresponding scaling factor have to be re-ordered with the matching group. Once all the sub-carriers find their matching group, the fast in line coding algorithm described in reference [2] provides bit encoding and complementary decoding methods.

5.1.3 Transmitter IFFT and Receiver FFT

The MDSL DMT divides the whole spectrum from 0 to 640 kHz into 128 equally spaced sub-carriers. The sub-carriers 36 to 127 are used for downstream transmission and sub-carriers 4 to 27 for upstream transmission. In MTU-C transmitter the inverse FFT has N=128 tones in equation (1). The lower part of tones are set to zero $$X_i = 0, \ i = 0 \text{ to } 35.$$

The tone 64 is used for pilot tone and is loaded with a constant complex value.

$$X_{64} = A_{c\text{-}PILOT}.$$

In MTU-C receiver the forward FFT has N=32 tones. In both downstream and upstream direction the FFT frame rate is the same as 4 kHz. Therefore, the sample rate of receiver FFT is one quarter of that transmitter IFFT.

5.1.4 Clipping Control

The DMT modulation scheme has high peak to average output. To maintain a certain transmission power level the peak voltage of AFE has to be high. This creates the problem for line driver design and practical installation. The DMT system usually uses hard clipping, interleaving and Reed-Solomon coding to reduce the signal peak to average ratio. However, since MDSL DMT may run without error correction, hard clipping is excluded from design consideration. An alternative clipping protection mechanism is used to prevent the clipping noise degradation [3].

At DMT transmitter the clipping event can be known as early as IFFT process. If clipping happens, instead of transmitting the output of IFFT, the DMT transmitter simply sends out the pilot tone to inform the receiver that the current frame has been corrupted and has been dropped from the stream. In the next two consecutive frames the DMT transmitter splits the clipped frame IFFT input into two separate transmission frames as:

MTU-C frame 1:

$$X'_i = \begin{cases} X_i, & 0 \leq i < 82 \\ 0, & \text{others} \end{cases}$$

MTU-R frame 2:

$$X'_i = \begin{cases} X_i, & 82 \leq i < 128 \\ A_{C\text{-}PILOT}, & i = 64 \\ 0, & \text{others} \end{cases}$$

For the clipped frame, there needs to be two additional frames to deliver the data and consequently causes two extra frame delays. This clipping induced burst can be handled with the framing and flow control process. For example, if a clipping threshold is set as high as that the probability of clipping is less than $10^{-7}$, the adverse effect of clipping control algorithm on the throughput is negligible. At MTU-R a complementary process brings back the split frames together.

5.1.5 Circular Prefix

As discussed in section 4, DMT typically needs a circular prefix to provide certain guard time between frames. Ideally, the circular prefix should be longer than the length of the channel impulse response. However, the longer the circular prefix, the higher the overhead has to be added to the real data frame. On the other hand, if the circular prefix is shorter than the length of channel impulse response, at modem receiver DMT requires an additional time domain equalizer (TEQ) to shorten the channel impulse response length within the circular prefix. Generally, the longer the channel impulse response length comparing to the circular prefix, the more TEQ taps are required to partially equalize the channel. It is a trade-off between channel efficiency and implementation complexity. In the case of MDSL the usable cable bandwidth is broader than the DSP process bandwidth. Therefore, the circular prefix is chosen longer than that of ADSL in terms of the data frame percentage.

In the downstream direction, i.e. MTU-C transmitter, the circular prefix is 64 points out of the 256 points FFT frame size. In the upstream direction, i.e. MTU-C receiver, the circular prefix is 16 points out of 64 points FFT size.

5.1.6 Time Domain Equalizer (TEQ)

The object of an MDSL modem is to have a low cost modem at the client's side. Therefore, frequency division multiplexing (FDM) is chosen over echo cancellation (EC). The FDM mode saves the computation power on the MTU-R side. However, since the FDM modem transmitter has to use a sharp analog filter to cut off the echo signal, it introduces the long group delay for MTU-C modem receiver to compensate. Actually, the side effect may not be severely bad since at MTU-C the receiver sampling rate is only one quarter of that MTU-C transmitter, and the MTU-C TEQ runs at the sampling rate.

At the MTU-R side, the transmitter uses an over-sampling technique to reduce the echo effect—refer to section 5.2.1. Since the Nyquist rate does not change, the MTU-C receiver can use one half of sampling rate that the MTU-R transmitter uses. After TEQ as MTU-C uses half the sampling rate of MTU-R, the MTU-C receiver removes 16 points of the circular prefix instead of 32 points that the MTU-R transmitter puts on before doing FFT process.

To keep the TEQ tape short at the MTU-R, the MTU-C transmitter filter has to be carefully designed to have short group delay.

5.1.7 Frequency Domain Equalizer (FEQ) and Phase Rotator

The frequency domain equalizer (FEQ) flats the received signal spectrum and compensates the phase distortion. The slicer after the FEQ makes the hard decision on the transmitting signals. The errors obtained between the FEQ output and the slicer output can further be used to update the FEQ coefficients. However, since the signal amplitude on each sub-carrier dramatically changes with the frequency, the convergence speed of FEQ for each sub-carrier is not uniform. The FEQ convergence speed spread is similar to the general eigenvalue spread problem. To solve the non-uniform convergence problem of FEQ, instead of a single FEQ, the two stage combination of FEQ and phase rotator is used on MDSL DMT receiver [4]. The FEQ roughly compensates the amplitude variation and the phase rotator further tracks the small variation of the channel.

5.2 MTU-R Specification

The MTU-R has almost the same function blocks as the MTU-C except that the MTU-R is responsible for timing recovery. The function blocks: framing and flow control, bit loading and constellation encoding, FEQ and phase rotator are the same as MTU-C. Their specifications do not repeat here.

5.2.1 Transmitter IFF and Receiver FFT

The MDSL DMT uses tones 0 to 31 for upstream transmission. However, since in the MTU-R transmitting path the analog filter may not offer enough frequency cut-off, the transmitter IFFT covers 64 tones and sets the upper 32 tones to zero as:

$X_j=0$, for $j=32$ to $64$.

This gives additional 20 dB attenuation in the stop band. Both downstream and upstream use 4 kHz frame rate. Since the Nyquist tone index is 32 for upstream, to cover the double size 64 tones FFT the sampling rate has to be doubled comparing with 32 tones FFT. At the MTU-R receiver, the echo signal from tone 32 to 64 overlaps with the incoming signal. If the echo signal and the incoming data signal align in frame and there is no ISI, the echoes at the tone 32 to 64 are zero since there is no loading on those tones. It is desirable to set the transmission timing so that the echo signal frame aligns with the incoming signal frame.

For MTU-R receiver FFT, to be a complementary process of MTU-C transmitter IFFT, the receiver FFT has 128 tones and therefore is 256 real transform.

5.2.2 Clipping Control

In the upstream direction the MTU-R uses the same idea as the downstream to handle the clipping. Since there is no need for pilot tone in the upstream direction, the MTU-R transmitter sends the silence frame as the clipping indicator when the clipping at the transmitter occurs. As in 5.1.4 when the clipping has been detected the MTU-R splits the frame in two for consecutive transmission:

frame 1:

$$X'_j = \begin{cases} X_j, & \text{for } 0 \leq j < 32 \\ 0, & \text{for } 32 \leq j < 64 \end{cases}$$

frame 2:

$$X'_j = \begin{cases} 0, & \text{for } 0 \leq j < 16 \\ X_j, & \text{for } 16 \leq j < 32 \\ 0, & \text{for } 32 \leq j < 64 \end{cases}$$

5.2.3 Circular Prefix

In the MTU-R transmission path, since DMT uses the oversampling IFFT to reduce the signal echo at the receiver, the IFFT output has 128 samples. To have the same overhead ratio as downstream the length of the circular prefix is chosen for 32 points.

5.2.4 Timing Recovery

In MDSL implementation, MTU-C provides the master clock. MTU-R does the timing recovery to recover the MTU-C master clock at the client side. MTU-R uses the same recovered downstream clock for upstream transmission. Therefore, if the clock of the MTU-C receiver locks to its transmitter, the MTU-C does not need to recover the timing at the central office.

For low cost implementation a numerically controlled oscillator (NCO) instead of VCXO is used to track the transmitter clock. NCO is basically a discrete digital divider to divide a high frequency master clock down to an appropriate sampling frequency. Assuming the nominal dividing ration is N, if the local clock runs too slowly then the dividing ratio can reduce to N−1; on the other hand, if the local clock runs too fast, the dividing ratio should increase to N+1.

A digital filter runs in parallel with FFT to filter out the pilot tone. A first order IIR filter provides a good result for the sinusoid pilot tone. Both "sin" and "cos" signals can be obtained by shifting one with respecting to the other. By using both "sin" and "cos" signals the exact sampling phase can be measured. The phase error then drives the phase locked loop (PLL).

The pilot tone also appears at the output of the receiver FFT. However, since at the output of receiver FFT, the phase of the pilot tone not only depends on the sampling phase also depends on the starting of the frame, it can be used for frame synchronization.

6. Initialization

To have MTU-C and MTU-R modem pairs talk to each other after power up, they have to exchange activation information to check if the other modem is ready to communicate. If both ends agree to set up the communication link, the modem pair need to synchronize one to the other and train each other's equalizer. For DMT the modem transmitter also needs to know the channel conditions to determine bit loading on each tone. All these processes are handled by an initialization training protocol. The detailed initialization protocol is described in [5].

DMT MDSL Initialization Procedure

I. Introduction

The MDSL transceiver initialization process allows the MDSL remote modem (MTU-R) set up the call connection with the MDSL central office modem (MTU-C). The MTU-R modem always initializes the connection request after its power-up as in ADSL. If the MTU-C modem is ready, the MTU-C modem should respond to the MTU-R request by sending the activation tones. The MTU-R uses R-ACK3 to acknowledge the activation signal from the MTU-C and to distinguish an MDSL remote modem from a standard ADSL modem. The MDSL remote modem is inter-operable with a standard ADSL modem during this activation process and is able to allow the ADSL central office modem recognizing the remote MDSL modem.

After the activation process both central office modem and remote modem will know each other's MDSL identity. The modem pair can continue with the MDSL handshakes and train the equalizers on both ends. The MDSL transceiver training process is different from that of the ADSL. The MDSL modem uses its improved training sequence for synchronization, time and frequency domain equalizers (TEQ and FEQ) training. During the transceiver training process the modems on both ends can also roughly estimate the channel attenuation and adjust its transmission power.

After the transceiver training process, the modem on each end needs to send a known sequence to the other end to measure the channel SNR. Based on the measured channel SNR the modem receiver computes bit-loading using the algorithm described in [1].

Finally, the modem receiver sends the bit-loading information to the transmitter end for constellation encoding. The entire initialization procedure is sown in FIG. 1.

FIG. 1 Overview of initialization

| MTU-C | | | |
|---|---|---|---|
| Activation and acknowledgement | Transceiver training | Channel analysis | Exchange |
| MTU-R | | | |
| Activation and acknowledgement | Transceiver training | Channel analysis | Exchange |

II. Initialization

FIG. 2 Timing Diagram of Activation and Acknowledgment

| C-IDLE | C-QUIET1/C-TONE R-ACT-REQ/R-QUIET1 | C-ACT 1, 2, 3, OR 4 | C-QUIET2 R-ACK3 |

1. Activation and Acknowledgement—MTU-C

MDSL MTU-C uses the same pre-active states as in ADSL for activation.

1.1 Pre-activate State

As in ADSL three pre-activation states at the MTU-C are supported.

1.1.1 C-IDEL1

Upon power-up the MTU-C shall enter state C-IDLE. When the MTU-C is in C-IDLE, a command from the host controller shall cause it to go to one of the states C-QUIET1, C-TONE or C-ACT.

1.1.2 C-QUIET1

The MTU-C shall enter C-QUIET1 from C-IDLE in response to a host command. A successful detection of R-ACT-REQ shall cause it to go to state C-ACT.

IDLE and QUIET signals are defined as zero output voltage from the DAC.

1.1.3 C-TONE

The MTU-C shall transmit C-TONE to instruct the MTU-R not to transmit R-ACT-REQ. C-TONE is a single frequency sinusoid at $f_{c\text{-}TONE}$=310.5 kHz. C-TONE is defined as $$X_k = \begin{cases} 0, k \neq 72, 0 \leq k \leq 256 \\ A_{C\text{-}TONE}, k = 72 \end{cases}$$

where $A_{C\text{-}TONE}$ shall be such that the transmit power level is −4 dBm for the first 64 symbols, and −28 dBm for the second 64 symbols. This signal shall be transmitted for 128 consecutive symbols. C-IDLE immediately follows C-TONE.

1.2 C-ACTIVATE

To be compatible with ADSL in the activation stage any one of the four activation signals can be used.

1.2.1 C-ACT1

C-ACT1 is a single frequency sinusoid at $f_{c\text{-}ACT1}=207$ kHz. C-ACT1 is defined as $$X_k = \begin{cases} 0, k \neq 48, 0 \leq k \leq 256 \\ A_{C\text{-}ACT}, k = 48 \end{cases}$$

1.2.2 C-ACT2

C-ACT2 is a single frequency sinusoid at $f_{C\text{-}Act2}=189.75$ kHz. C-ACT2 is defined as $$X_k = \begin{cases} 0, k \neq 44, 0 \leq k \leq 256 \\ A_{C\text{-}ACT}, k = 44 \end{cases}$$

1.2.3 C-ACT3

C-ACT3 is a single frequency sinusoid at $f_{C\text{-}ACT3}=224.25$ kHz. C-ACT3 is defined as $$X_k = \begin{cases} 0, k \neq 52, 0 \leq k \leq 256 \\ A_{C\text{-}ACT}, k = 52 \end{cases}$$

1.2.4 C-ACT4

C-ACT4 is a single frequency sinusoid at $f_{C\text{-}ACT4}=258.75$ kHz. C-ACT4 is defined as $$X_k = \begin{cases} 0, k \neq 60, 0 \leq k \leq 256 \\ A_{C\text{-}ACT}, k = 60 \end{cases}$$

The power level for $A_{C\text{-}ACT}$ is −4 dBm for the first 64 symbols, and −28 dBm for the second 64 symbols. C-QUITE2 immediately follows C-ACT.

1.3 C-QUIET2

The purpose of C-QUIET2 is to allow the detection of R-ACK3. After C-QUIET2, MTU-C shall enter one of two states:

C-REVEILLE: If the MTU-C detects R-ACK3 it shall enter the state C-REVEILLE.

C-IDLE1: If the MTU-C does not detect R-ACK3 it shall return to C-IDLE1.

2. Activation and Acknowledgement—MTU-R

The MTU-R sends R-ACT-REQ for requiring connection set up and uses R-ACK3 for MDSL identification.

2.1 R-ACT-REQ

MTU-R initiates a communication link by transmitting R-ACT-REQ after power up. It is a single sinusoid at $f_{R\text{-}ACT\text{-}REQ}=34.5$ kHz, which is defined by $$X_k = \begin{cases} 0, k \neq 8, 0 \leq k \leq 32 \\ A_{R\text{-}ACT\text{-}REQ}, k = 8 \end{cases}$$

The transmission power level of $A_{R\text{-}ACT\text{-}REQ}$ is −2 dBm (approximately −38 dBm/Hz over 4.3125 kHz) for the first 64 symbols and −22 dBm for the second 64 symbols, and $A_{R\text{-}ACT\text{-}REQ}=0$ for the next 896 symbols. This signal is transmitted for 1024 consecutive symbols. The MTU-R shall stay in R-ACT-REQ until either a successful detection of C-ACT signal from the MTU-C, in which case the MTU-R shall enter R-ACK as soon as the full duration of the C-ACT signal has been detected;

a successful detection of C-TONE signal from the MTU-C, in which case then MTU-R shall enter R-QUIET.

2.2 R-QUIET1

The duration of R-QUIET1 depends upon whether the MTU-R detects C-ACT:

if the MTU-R detects C-ACT it shall immediately enter R-ACK;

if it does not, it shall remain quiet for 240,000 symbols and the re-enter R-ACT-REQ.

2.3 R-ACK3

R-Acknowledgement is an acknowledgement of the detection of C-ACT. Three acknowledge signals are defined by T1E1 committee. The uses of R-ACK1 and R-ACK2 are predefined for ADSL; R-ACK3 is used for this MDSL modem. It is a single sinusoid at $f_{R\text{-}ACK3}=60.375$ kHz defined by $$X_k = \begin{cases} 0, k \neq 14, 0 \leq k \leq 32 \\ A_{R\text{-}ACK3}, k = 14 \end{cases}$$

where $A_{R\text{-}ACK3}$ shall be such that the transmit power level is −2 dBm for the first 64 symbols and −22 dBm for the second 64 symbols. This signal shall be transmitted for 128 consecutive symbols. R-QUIET2 follows immediately after R-ACK3.

| C-PILOT1 | C-QUIET3 | C-REVERB1 | C-PILOT2 | C-REVERB2 | C-SYNC1 |
|---|---|---|---|---|---|
| R-QUIET2 | R-REVERB1 | R-QUIET3 | R-REVERB2 | R-QUIET4 | R-REVERB3 | RSYNC1 |

FIG. 3 Timing Diagram of Transceiver Training

3. Transceiver Training—MTU-C

MTU-C starts transceiver training by sending C-PILOT1 downstream to acknowledge that R-ACK3 has been received. In MDSL only MTU-R can perform loop timing. MTU-C and MTU-R train their time and frequency domain equalizer (TEQ and FEQ) alternatively.

3.1 C-PILOT1

C-PILOT1 is a single frequency sinusoid at $f_{C\text{-}PILOT}=276$ kHz, defined by $$X_k = \begin{cases} 0, k \neq 64, 0 \leq k \leq 256 \\ A_{C\text{-}PILOT1}, k = 64 \end{cases}$$

The power level of $A_{C\text{-}PILOT1}$ is −4 dBm, and the duration is 512 symbols. The C-PILOT1 shall be used as an acknowledgement of their detection of R-ACK. C-QUIET3 follows C-PILOT1.

3.3 C-QUIET3

During C-QUIET3 the MTU-C measure the received upstream power of R-REVERB1 and thereby calculate a downstream PSD. The MTU-C shall stay in C-QUIET3 for at least 1024 symbols before entering C-REVERB1.

3.3 C-REVERB1

C-REVERB1 is a signal that allows the MTU-R receiver to adjust its AGC to an appropriate level, perform frame synchronization and time-domain equalizer (TEQ) training. The C-REVERB1 shall be the pseudo-random downstream sequence, $d_n$, for n=1 to 320. The sequence $d_n$ is defined as:

$d_n=1$ for $n=1$ to 9

$d_n=d_{n-4} \oplus d_{n-9}$ for $n=10$ to 304

$d_n=1$ for $n=305$ to 320, and repeats every frame. The bits are mapped to a time domain binary signal without modulation. The polarity of the mapping flips every two frames.

$$sgn(y_n) = \begin{cases} sgn(2 \cdot d_n - 1), \text{ for frame } 0, 1 \\ sgn(-2 \cdot d_n + 1), \text{ for frame } 2, 3 \end{cases}$$

The binary time domain signal $y_n$ is then mixed with the time domain signal $C_{C\text{-}PILOT1}$ of C-PILOT1 as $y_n + C_{C\text{-}PILOT1}$.

The signal repeats every four frames with transmission PSD as

| Upstream received poser < | 3 | 4 | 5 | 6 | 7 | 8 | 9 | dBm |
|---|---|---|---|---|---|---|---|---|
| Max downstream PSD | −40 | −42 | −44 | −46 | −48 | −50 | −52 | dBm/Hz |

The duration of C-REVERB1 is 8192 symbols. C-PILOT2 follows C-REVERB1 immediately.

3.4 C-PILOT2

The signal of C-PILOT2 is the same as that of C-PILOT1. During C-PILOT2, MTU-C detects R-REVERB2 to adjust its AGC, perform frame synchronization and TEQ training. The duration of C-PILOT2 shall be 9232 symbols. C-REVERB2 follows C-PILOT2.

3.5 C-REVERB2

C-REVERB2 is a frequency domain training sequence for MTU-R FEQ training. The sequence $d_n$, which is

| | |
|---|---|
| $d_n = 1$ | for n = 1 to 9 |
| $d_n = d_{n-4} \oplus d_{n-9}$ | for n = 10 to 256, | repeats itself every frame. The sequence $d_n$ is mapped to frequency domain 4-QAM constellation points. The mapping polarities alternate every frame:

| | sgn($X_i$) | sgn($Y_i$) |
|---|---|---|
| for odd frame | sgn(2 · $d_{2i}$ − 1) | sgn(2 · $d_{2i+1}$ − 1) |
| for even frame | sgn(−2 · $d_{2i}$ + 1) | sgn(−2 · $d_{2i+1}$ + 1). |

The time domain signal is inverse FFT of X with circular prefix. The transmission PSD is −40 dBm/Hz. The duration is 4096 frames. (The 4096$^{th}$ frame is with even polarity). After the C-REVERB2, MTU-C enters C-SYNC1.

During the C-REVERB2, MTU-C also detects R-QUIET4 and R-REVERB3 and starts to train its FEQ.

3.6 C-SYNC1

C-SYNC1 are two consecutive frames with the same odd frame polarity as in the C-REVERB2 to synchronize the FEQ polarity of FEQ. The C-MEDLEY follows the C-SYNC1 immediately.

4. Transceiver Training—MTU-R

4.1 R-QUIET2

R-QUIET2 is the period to allow MTU-R receiving MDSL acknowledgement C-PILOT1. The duration for C-QUIET2 is 544 symbols. The MTU-R enters one of the following states after the R-QUIET2

R-REVERB1 if C-PILOT1 is received.

R-ACT-REQ if C-PILOT1 is not received.

4.2 R-REVERB1

R-REVERB1 is a signal that allows the MTU-C to calculate downstream PSD. The R-REVERB1 shall be the pseudo-random upstream sequence, $d_n$, for n=1 to 80. The sequence $d_n$ is defined as:

$d_n=1$ for $n=1$ to 11

$d_n=d_{n-5} \oplus d_{n-6}$ for $n=12$ to 74

$d_n=1$ for $n=75$ to 80, and repeats every frame. A time domain binary signal is mapped from sequence $d_n$ without modulation. The polarity of the mapping flips every two frames.

$$sgn(y_n) = \begin{cases} sgn(2 \cdot d_n - 1), \text{ for frame } 0, 1 \\ sgn(-2 \cdot d_n + 1), \text{ for frame } 2, 3 \end{cases}$$

The signal repeats every four frames with transmission PSD as −40 dBm/Hz. The period of R-REVERB1 is 1024 symbols. MTU-R enters R-QUIET3 after R-REVERB1.

During R-REVERB1, MTU-R can also measure the echo path and echo delay and train its pseudo-echo chancellor.

4.3 R-QUIET3

R-QUIET3 is the period that MTU-R adjusts its AGC, detects C-REVERB1, performs frame synchronization and train its TEQ. The period is 8192 symbols. R-REVERB2 follows R-QUIET3.

4.4 R-REVERB2

R-REVERB2 is the same as R-REVERB1 to train MTU-C TEQ. The duration of R-REVERB2 is 8192 symbols. After the R-REVERB2, MTU-R enters R-QUIET4.

4.5 R-QUIET4

R-QUIET4 is the period to allow MTU-C transiting from TEQ training to FEQ training. After 16 symbols of R-QUIET4, MTU-R enters R-REVERB3.

4.6 R-REVERB3

R-REVERB3 is as frequency domain training sequence for MTU-R FEQ training. The sequence $d_n$, which is:

$d_n=1$ for $n=1$ to 6

$d_n=d_{n-5}\oplus=d_{n-6}$ for $n=7$ to 64, repeats itself every frame. The sequence $d_n$ is mapped to frequency domain 4-QAM constellation points. The mapping is as:

sgn($X_i$) sgn($Y_i$)

sgn($2 \cdot d_{2i}-1$) sgn($2 \cdot d_{2i+1}-1$)

The time domain signal is inverse FFT of X with circular prefix. The transmission PSD is −40 dBm/Hz. The duration is 4080 frames. After the R-REVERB3, MTU-R enters R-SYNC1.

4.7 R-SYNC1

R-SYNC1 is the synchronization frame with inverse polarity as:

sgn($X_i$) sgn($Y_i$)

sgn($-2 \cdot d_{2i}+1$) sgn($-2 \cdot d_{2i+1}+1$).

MTU-R enters R-MEDLEY immediately after the R-SYNC1.

| FIG. 4 Timing Diagram of Channel Analysis | |
| --- | --- |
| C-MEDLEY | C-SYNC2 |
| R-MEDLEY | R-SYNC2 |

5 Channel Analysis—MTU-C

During channel analysis both MTU-C and MTU-R measure upstream and downstream SNRs compute bit-loading, packing and unpacking algorithms.

5.1 C-MEDLEY

C-MEDLEY is a wideband pseudo-random signal used for estimation at the MTU-R of the downstream SNR. The pseudo-random sequence is defined as:

$d'_n=d_n\oplus d'_{n-18}\oplus d'_{n-23}$ starting with $$d_n = \begin{cases} 0, n = 1 \sim 22 \\ 1, n = 23 \end{cases}$$

The sequence $d_n$ modulates to 4-QAM constellation of each DMT sub-carrier except for the pilot tone. The constellation mapping is as:

| 3 | 0 |
| --- | --- |
| 2 | 1 |

MTU-C should stay in C-MEDLEY until either one of the following two scenarios happens:

If MTU-C receives R-SYNC2, MTU-C enters C-SYNC2.

If MTU-C cannot receive R-SYNC2 for 10 seconds, MTU-C enters C-IDLE.

During C-MEDLEY should also measure upstream SNR with signal R-MEDLEY, and compute upstream bit-loading, packing and unpacking algorithm.

5.2 C-SYNC2

C-SYNC2 are two synchronization frames the same as odd even frame pair in the C-REVERB2. C-REVERB3 follows C-SYNC2 immediately.

6 Channel Analysis—MTU-R

6.1 R-MEDLEY

R-MEDLEY is a wideband pseudo-random signal used for estimation at the MTU-C of the downstream SNR. The pseudo-random sequence is defined as:

$d'_n=d_n\oplus d'_{n-18}\oplus d'_{n-23}$ starting with $$d_n = \begin{cases} 0, n = 1 \sim 22 \\ 1, n = 23 \end{cases}$$

The sequence $d_n$ modulates to 4-QAM constellation of each DMT sub-carrier. The constellation mapping is as:

| 3 | 0 |
| --- | --- |
| 2 | 1 |

During R-MEDLEY should also measure upstream SNR with signal C-MEDLEY, and compute upstream bit-loading, packing and unpacking algorithm.

MTU-R should stay in R-MEDLEY for at least 32767 symbols before entering R-SYNC2

6.2 R-SYNC2

R-SYNC2 is the same as R-SYNC1 for message synchronization. R-MSGS1 follows R-SYNC2 immediately.

| C-REVERB3 | C-SYNC3 | C-MSGS1 | C-REVERB4 | C-SYNC4 |
| --- | --- | --- | --- | --- |
| R-MSGS1 | | R-REVERB4 | | R-SYNC4 |

FIG. 5 Timing Diagram of Exchange

7 Exchange MTU-C

7.1 C-REVERB3

C-REVERB3 is the same as C-REVERB1 to keep the synchronization of the MTU-R while MTU-R sends R-MSGS1. MTU-C should stay in C-REVERB3 until MTU-C has received entail R-MSGS1. C-SYNC3 follows the C-REVERB3.

7.2 C-SYNC3

C-SYNC3 is the same as C-SYNC2 to indicate the beginning of C-MSGS1. C-MSGS1 follows C-SYNC3 immediately.

7.3 C-MSGS1

C-MSGS1 is the upstream bit-loading message. The message is transmitted at 2 kbps, i.e., 2 frames per bit. The bit signal is similar to that of C-SYNC3. If (+,−) is frame polarity to represent the C-SYNC3, then in C-MSGS1 (+,−) represents "0" and (−,+) represents "1". MTU-C enters C-REVERB4 after the C-MSGS1.

7.4 C-REVERB4

C-REVERB4 is the same as C-REVERB3. During the C-REVERB4 both MTU-C and MTU-R set up their encoding algorithm and is ready for data communication. Since the downstream uses more tones than the upstream, MTU-C enters C-SYNC4 after it finishes the encoding setup.

7.5 C-SYNC4

C-SYNC4 is the same as C-SYNC3 to start the real data downstream transmission. MTU-C enters show-time mode immediately after the C-SYNC4.

8 Exchange MTU-R

8.1 R-MSGS1

R-MSGS1 is the downstream bit-loading message. The message is transmitted at 4 kbps, i.e., one frame per bit. The bit signal is similar to that of R-SYNC2 If—is frame polarity to represent the R-SYNC2, then in R-MSGS1 + represents "0" and − represents "1". The MTU-R enters R-REVERB4 after the C-MSGS1.

8.2 R-REVERB4

R-REVERB4 is the same as the R-REVERB3. During the R-REVERB4, MTU-R receives C-MSGS1 and sets up its upstream encoding algorithm. The MTU-R should stay in R-REVERB4 until it receives C-SYNC4 and then enters R-SYNC4.

8.3 R-SYNC4

R-SYNC4 is the same as R-SYNC3 to start the real data downstream transmission. The MTU-R enters show-time mode immediately after the R-SYNC4.

Adaptive Full Dynamic Range Frequency Domain Equalizer for DMT Based xDSL Modem

1. Introduction

Figure 9:
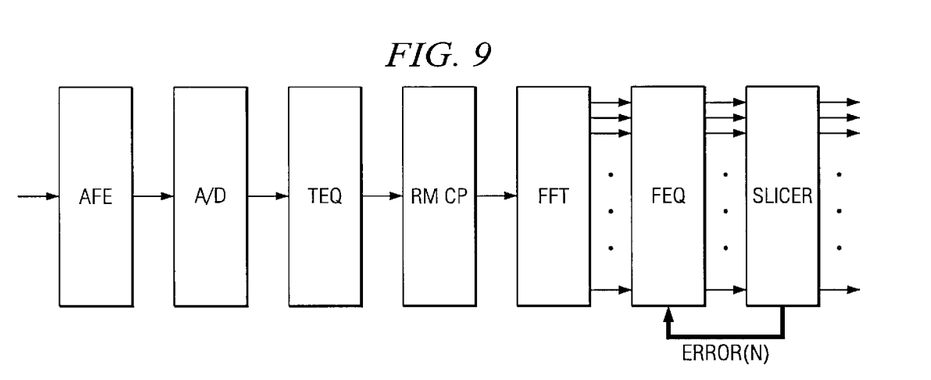
FIG. 9 is a block diagram of a typical DMT receiver.

In a Discrete Multi-Tone modem receiver, the channel equalization is typically contributed by separate time domain and frequency domain equalizers. Time domain equalizer (TEQ) shorts the channel impulse response, therefore reducing the inter-symbol interference. The frequency domain equalizer implemented on each sub-carrier equalizes the channel amplitude and phase distortions at the sub-carrier frequency. The block diagram for a typical DMT receiver is shown in FIG. 1.

For a typical twisted copper wire loop, the frequency response differs dramatically across the band as shown in FIG. 2. Since ADSL uses the frequency band from 0 to 1 MHz, the received signal at each frequency will have up to 30 dB dynamic range. The frequency domain equalizer (FEQ) has to flatten this received signal spectrum. Typically, the coefficients of FEQ has to be dynamically updated to compensate the small loop drift using least mean square (LMS) algorithm. However, since the convergence speed depends on the signal amplitude, the divergence in the signal amplitude adversely affects FEQ convergence. In this work a separated fixed gain corrector and adaptive phase rotator are invented to compensate the wide dynamic range differences in incoming signals.

2. Convergence of the FEQ

Assuming FEQ at frequency bin n is G(n), n is the frequency bin index, the equalized data at the equalizer output is then $$Y(n)=G(n)*X(n). \tag{1}$$

The value of FEQ G(n) can be initialized during the training process and updated on the fly using LMS algorithm $$G_{k-1}(n)=G_k(n)+\mu*e(n)*X(n) \tag{2}$$

where e(n) is the error signal obtained from the slicer. When FEQ is updated on the fly with the decision directed computation, the maximum value of e(n) is bounded by the decision region and is independent of frequency bins. However, since X(n) follows the channel response shown in FIG. 2, it ranges 30 dB difference in amplitude. The relative speed in convergence for different bins is then $$\Delta(n) = \frac{G_{k+1}(n) - G_k(n)}{G(n)} \tag{3}$$
$$= \frac{\mu*e(n)*X'(n)*X(n)}{Y(n)}$$

The variance of the equalized data Y(n) is relatively small comparing to that of X(n). The amplitude of Y(n) can be approximated as a constant. The convergence speed of Δ(n) then differs dramatically among each frequency bins because it is proportional to $|X(n)|^2$. Practically, the step size Δ(n) has to be limited within certain range. If the step size is too big, it will cause instability of the LMS algorithm. On the other hand if the step size is too small, it will not compensate the channel change fast enough.

3. Invention of the Work

Figure 10:
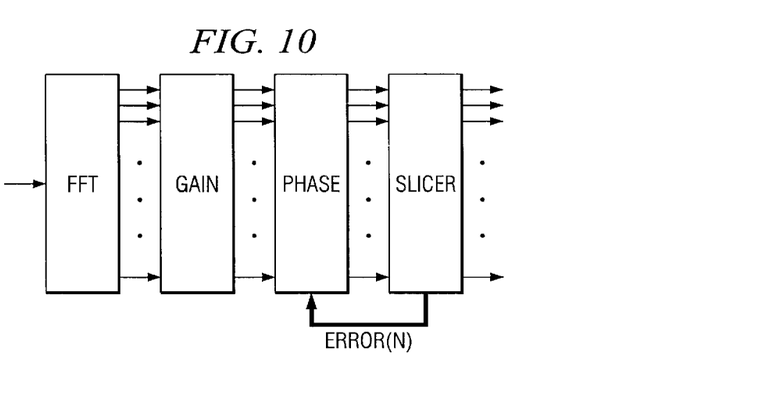
FIG. 10 is a block diagram of a wide dynamic range adaptive FE.

To compensate the convergence speed spread problem in the DMT receiver, the FEQ is split into a gain corrector F(n) and a phase rotator R(n) as shown in FIG. 3. The combined effect of gain correction and phase rotation is then:

$$G(n)=F(n)*R(n). \tag{4}$$

The purpose of the gain corrector is to roughly compensate the channel frequency roll-off, and makes each tone to have approximately the same amplitude before the phase rotator. The value of the gain corrector F(n) is set as F(n)≈G(n) during the initialization training process, and leaves it unchanged. The channel variation is subsequently tracked by updating the phase rotator R(n) with LMS algorithm.

$$R_{k+1}(n)=R_k(n)+\mu*e(n)*F(n)*X(n), \tag{5}$$

since $$Y(n)=F(n)*R(n)*X(n). \tag{6}$$

As R(n) starts at $R_o(n)=1$ and is mostly only for compensating the phase rotation, the amplitude of R(n) will be close to the unit. The relative speed of convergence on R(n) is $$\delta(n) = \frac{R_{k+1}(n) - R_k(n)}{G(n)} \tag{7}$$
$$= \frac{\mu*e(n)*F'(n)*X'(n)}{R(n)}$$

Since |R(n)|≈1, the absolute step of (7) is $$|\delta(n)|\approx|\mu*e(n)*Y(n)|, \tag{8}$$

which is almost independent of tone index, because the size of both e(n) and Y(n) are the same for every tones.

In summary, to balance the FEQ convergence speed of each different tones, a gain corrector and a phase rotator are used to replace the single tap FEQ. The fixed gain corrector is to roughly scale the each tone distorted by the channel to the approximately same amplitude. The dynamically adapted phase rotator further tracks small channel variation. Since the input amplitude of phase rotator for each tone is approximately the same, the convergence speed of each phase rotator is uniform.

MDSL-DMT Bit-loading Setup

1. Introduction

During DMT modem initialization or channel adapting the two sites, CO (Central Office) and RU (Remote Unit) need exchanging messages for channel utilization, data rate negotiation and tone ordering. Channel utilization means how many bits will be signed to each sub-channel (or tone). The said channel has 128 sub-channels for downstream (CO to RU) and 32 sub-channels for upstream (RU to CO). Data rate negotiation will follow channel set up and tell the system how many bits per second the current channel can transmit for downstream and upstream. The both sites also need to tell each what is the tone order for the data stream, which tone comes first and which tone comes later to load the bits from said data stream. This document specifies the message format and its set up procedure for said exchange.

2. Bit-loading Setup

Both CO and RU send and receive QAM signals to/from each other at the same time. Once enough data has been collected, both sites will calculate the gains from the divagation (a kind of error distribution from received signals) on all sub-channels or tones. Each tone has a different gain then can be signed with different bits and corresponding power coefficient. When finished with the bit-loading set up, the setup table (see BitLoadSetup Table format) will be sent to other sites for encoding set up. FIG. 1 describes the program flow and the data flow for the both sites.

The BitLoadSetup procedure describes the program flow and the data flow for the both sites, CO and RU. Both sites are similar but RU might run slower because of more data (more tones from CO) to be estimated. The WAIT process can let CO and RU run balanced.

The BitLoadSetup Table format shows both message tables exchanged from each site, CO and RU. Both CO and RU can set up their decoding but need each other's Bit-LoadSetup Table to set up their encoding.

3. Bit Rate Negotiation

CO and RU can negotiate bit rate with each other by reading BitRateUP sent from RU and reading BitRateDown sent from CO. MacIndLenCO and MacIndLenRU can also be used for bit rate negotiation, which two variables are the total numbers of 16-bit words per DMT frame.

Both CO and RU sites set up their bit rate upon the bit-loading initialization. Once the system estimates the channel and calculates how many bits for each sub-channel, the bit rate can be set by counting the bits on all sub-channels. The bit rate is formatted as to how many kbps with increments of 80 kbps.

Down Stream Bit Rate (CO to RU): BitRateDown (see BitLoadSetupTable Format) can be read from the data block from CO to RU after the bit-loading set up.

Up Stream Bit Rate (RU to CO): BitRateUP (see BitLoadSetupTable Format) can be read from the data block from RU to CO after the bit-loading set up.

Total number of 16-bit words per DMT frame: MacIndLenCO is the macro index length of CO. It also equals to the total number of 16-bit words per DMT frame. MacIndLenRU is the macro index length of RU and the total number of 16-bit words per DMT frame.

4. Bitloadsetuptable Format 4.1 Structure of BitLoadSetupTableCO (CO to RU):

BitLoadSetupTableCO describes the data block sending from CO side to RU side. They carry the information for both sides to set up the system for bit loading. The major purposes are bit rate negotiation, bit loading initialization and transmission error control.

| Name of Items | Number of Bits | Notes |
|---|---|---|
| BitLoaddHeadCO | 16 | = 0x0F0F |
| CheckSumCO | 16 | check sum for error control |
| TotalBitsCO | 16 | total data length |
| NumToneCO | 16 | # of tones |
| NumToneUsedCO | 16 | # of tones used for bit loading |
| FrameRateDown | 16 | = 5 kHz/s |
| BitRateDown | 16 | down stream bit rate |
| MacIndLenCO | 16 | macro index block length |
| GainRateCO | 16 | gain rate |
| GainBitIncCO | 16 | gain-to-bit increment |
| TableTempCO1 | 16 | temp variable |
| TableTempCO2 | 16 | temp variable |

-continued

| Name of Items | Number of Bits | Notes |
|---|---|---|
| GainEncCO[ ] | 16 × NumToneCO | encode gains |
| MacIndCO[ ] | 16 × NumToneCO | macro index data block |
| ToneIndCO[ ] | 16 × NumToneCO | tone index data block |

4.1.1 BitLoadHeadCO

BitLoadHeadCo denotes the head information of the BitLoadSetupTableCO data structure. Its default value equals 0000111100001111 in binary, or 0x0F0F in hex.

4.1.2 CheckSumCO

CheckSumCO defines the sum of all sending words but itself, accumulated in every 16 bits. It can be used for error control and program debugging.

4.1.3 TotalBitsCO

TotalBitsCO=16 (12+3 NumToneCO). These are the total bits from CO to RU, including BitLoadHeadCO, CheckSumCO, itself and all following items.

4.1.4 NumToneCO

NumToneCO equals the number of tones from CO to RU, the default setting is 90.

4.1.5 NumToneUsedCO

NumToneUsedCO denotes Number of Tones Used sending from CO to RU. This number is dependent on the bit-loading algorithm and the random data. NumToneUsedCO is less than or equal to NumToneCO because some tones may not be used to carry any bit either those subchannels or tones are too noisy or those tones cannot be grouped into one word (16-bit).

4.1.6 FrameRateDown

FrameRateDown denotes Frame Rate for Downstream connection (CO to RU). The default setting is 5 kHz.

4.1.7 BitRateDown

BitRateDown denotes Bit Rate for Downstream connection (CO to RU, in kbps, increment by 80 kbps).

4.1.8 MacIndLenCO

MacIndLenCO equals to the Length of Macro Index data block, or total number of 16-bit words per frame, from CO to RU, which is variable dependent on channel. Its minimum and maximum value is NumToneCO×2/16 (min.), NumToneCO×8/16 (max.).

4.1.9 GainRateCO

GainRateCO is the Gain Rate for the downstream to adjust the gain. It will be used for GainEncCO[ ].

Gain=GainRateCO*Divagation, where the divagation is from channel estimation.

4.1.10 GainBitIncCO

GainBitIncCO denotes Gain-to-Bit Increment, mapping the gain to bit.

4.1.11 TableTempCO1

TableTempCO1 is the first temporal variable sending from CO to RU.

4.1.12 TableTempCO2

TableTempCO2 is the second temporal variable sending from CO to RU.

4.1.13 GainEncCO[cNumToneCO]

GainEncCO[cNumToneCO] is a sub-table of data for Encode Gains for CO.

GainEnc[ ]=GainRateCO*Divagation[ ], where the divagation is from channel estimation.

4.1.14 MacIndCO[cNumToneCO]

MacIndCO[cNumToneCO] is a sub-table of Macro Index data block on CO side for real-time bitloading.

4.1.15 ToneIndCO[cNumToneCO]

ToneIndCO[cNumToneCO] is a sub-table of Tone Index data block on CO Side for real-time bitloading.

| Name of Items | Number of Bits | Notes |
| --- | --- | --- |
| BitLoaddHeadRU | 16 | = 0x0F0F |
| CheckSumRU | 16 | check sum for error control |
| TotalBitsRU | 16 | total data length |
| NumToneRU | 16 | # of tones |
| NumToneUsedRU | 16 | # of tones used for bit loading |
| FrameRateUp | 16 | = 5 kHz/s |
| BitRateUp | 16 | down stream bit rate |
| MacIndLenRU | 16 | macro index block length |
| GainRateRU | 16 | gain rate |
| GainBitIncRU | 16 | gain-to-bit increment |
| TableTempRU1 | 16 | temp variable |
| TableTempRU2 | 16 | temp variable |
| GainEncRU[ ] | 16 × NumToneCO | encode gains |
| MacIndRU[ ] | 16 × NumToneCO | macro index data block |
| ToneIndRU[ ] | 16 × NumToneCO | tone index data block |

4.2 Structure of BitLoadSetupTableRU (to RU):

BitLoadSetupTableRU are the data blocks sending from the RU side to the CO side. They carry the information for both sides to set up the system. The major purposes are bit rate negotiation, bit loading initialization and transmission error control.

4.2.1 BitLoadHeadRU

BitLoadHeadRU denotes the head information of the BitLoadSetupTableRU data structure. Its default value equals 0000111100001111 in binary, or 0x0F0F in hex.

4.2.2 CheckSumRU

CheckSumRU defines the sum of all sending words but itself, accumulated in every 16 bits. It can be used for error control and program debugging.

4.2.3 TotalBitsRU

TotalBitsRU=16 (12+3 NumToneRU). These are the total bits from RU to CO, including BitLoadHeadRU, CheckSumRU, itself and all following items.

4.2.4 NumToneRU

NumToneRU equals the number of tones from RU to CO, the default setting is 90.

4.2.5 NumToneUsedRU

NumToneUsedRU denotes Number of Tones Used sending from RU to CO. This number is dependent on the bit-loading algorithm and the random data. NumToneUsedRU is less than or equal to NumToneRU because some tones may not be used to carry any bit either those subchannels or tones are too noisy or those tones cannot be grouped into one word (16-bit).

4.2.6 FrameRateUp

FrameRateUp denotes Frame Rate for Upstream connection (RU to CO). The default setting is 5 kHz.

4.2.7 BitRateUp

BitRateUp denotes Bit Rate for Upstream connection (RU to CO, in kbps, increment by 80 kbps).

4.2.8 MacIndLenRU

MacIndLenRU equals to the Length of Macro Index data block, or total number of 16-bit words per frame, from RU to CO, which is variable dependent on channel. Its minimum and maximum value is NumToneRU×2/16 (min.), NumToneRU ×8/16 (Max.).

4.2.9. GainRateRU

GainRateRU is the Gain Rate for the upstream to adjust the gain. It will be used for GainEncRU[ ].

Gain=GainRateRU*Divagation, where the divagation is from channel estimation.

4.2.10 GainBitIncRU

GainBitIncRU denotes Gain-to-Bit Increment, mapping the gain to bit.

4.2.11 TableTempRU1

TableTempRU1 is the first temporal variable sending from RU to CO.

4.2.12 TableTempRU2

TableTempRU2 is the second temporal variable sending from RU to CO.

4.2.13 GainEncRU[cNumToneRU]

GainEncRU[cNumToneRU] is a subtable of data for Encode Gains for RU.

GainEnc[ ]=GainRateRU * Divagation[ ], where the divagation is from channel estimation.

4.2.14 MacIndRU[cNumToneRU]

MacIndRU[cNumToneRU] is a subtable of Macro Index data block on RU side for real-time bitloading.

4.2.15 ToneIndRU[cNumToneRU]

ToneIndRU[cNumToneRU] is a subtable of Tone Index data block on RU side for real-time bitloading.

What is claimed is:

1. A Discrete Multi-Tone (DMT) device which comprises:
   (a) a frequency domain equalizer having variable coefficients for flattening a converted digital signal, said frequency domain equalizer comprising a gain corrector coupled to a Fast Fourish Transform (FFT) to compensate the channel frequency rolloff and make tones approximately the same amplitude before phase rotation and a phase rotator portion responsive to the output of said gain corrector to track small channel variation; and
   (b) circuitry for updating the coefficients of said frequency domain equalizer.

2. The device of claim 1 further including a slicer for controlling said frequency domain equalizer by feeding back an error signal thereto.

3. The device of claim 2 wherein said error signal is fed back to said phase rotator portion of said frequency domain equalizer.

4. The device of claim 3 wherein said device is a DMT receiver and further includes:
   (c) an analog front end for receiving an analog signal;
   (d) a converter for converting said analog signal to a digital signal;
   (e) a FFT for converting said digital signal from the time domain to the frequency domain and feeding said digital signal to said frequency domain equalizer.

5. The device of claim 2 wherein said device is a DMT receiver and further includes:
   (c) an analog front end for receiving an analog signal;
   (d) a converter for converting said analog signal to a digital signal;
   (e) a FFT for converting said digital signal from the time domain to the frequency domain and feeding said digital signal to said frequency domain equalizer.

6. The device of claim 1 wherein said device is a DMT receiver and further includes:
   (c) an analog front end for receiving an analog signal;
   (d) a converter for converting said analog signal to a digital signal;
   (e) a FFT for converting said digital signal from the time domain to the frequency domain and feeding said digital signal to said frequency domain equalizer.

* * * * *